US006848079B2

(12) United States Patent
Ito

(10) Patent No.: US 6,848,079 B2
(45) Date of Patent: Jan. 25, 2005

(54) DOCUMENT CONVERSION USING AN INTERMEDIATE COMPUTER WHICH RETRIEVES AND STORES POSITION INFORMATION ON DOCUMENT DATA

(75) Inventor: Naoko Ito, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/074,411

(22) Filed: May 8, 1998

(65) Prior Publication Data

US 2002/0023114 A1 Feb. 21, 2002

(30) Foreign Application Priority Data

May 8, 1997 (JP) .............................................. 9-118455

(51) Int. Cl.$^7$ ................................................ G06F 7/00
(52) U.S. Cl. ...................... 715/523; 715/500; 715/511; 707/203; 709/203; 345/751
(58) Field of Search ................................ 707/523, 501, 707/513, 524, 203; 345/750, 751, 753; 715/501.1, 513, 523–524, 500, 511; 709/203

(56) References Cited

U.S. PATENT DOCUMENTS

| | | | | |
|---|---|---|---|---|
| 4,751,740 A | * | 6/1988 | Wright ......................... | 382/180 |
| 4,956,806 A | * | 9/1990 | Crowe et al. ................. | 707/530 |
| 5,159,667 A | * | 10/1992 | Borrey et al. ................ | 707/500 |
| 5,530,852 A | * | 6/1996 | Meske, Jr. et al. ........... | 707/523 |
| 5,608,874 A | * | 3/1997 | Ogawa et al. ................ | 709/246 |
| 5,649,214 A | * | 7/1997 | Bruso et al. .................. | 707/523 |
| 5,671,428 A | * | 9/1997 | Muranaga et al. ........... | 345/329 |
| 5,673,322 A | * | 9/1997 | Pepe et al. ...................... | 705/52 |
| 5,708,825 A | * | 1/1998 | Sotomayor ................... | 707/501 |
| 5,708,828 A | * | 1/1998 | Coleman ...................... | 707/523 |
| 5,712,907 A | * | 1/1998 | Wegner et al. ............... | 379/112 |
| 5,813,007 A | * | 9/1998 | Nielsen ......................... | 707/10 |
| 5,819,273 A | * | 10/1998 | Vora et al. ..................... | 707/10 |
| 5,822,539 A | * | 10/1998 | van Hoff ..................... | 709/236 |
| 5,873,107 A | * | 2/1999 | Borovoy et al. .............. | 707/3 |
| 5,890,177 A | * | 3/1999 | Moody et al. ............... | 707/511 |
| 5,893,109 A | * | 4/1999 | DeRose et al. ............. | 707/104 |
| 5,898,836 A | * | 4/1999 | Freivald et al. ............. | 707/513 |
| 6,052,514 A | * | 4/2000 | Gill et al. .................... | 345/331 |
| 6,169,992 B1 | * | 1/2001 | Beall et al. .................. | 707/103 |
| 6,240,447 B1 | * | 5/2001 | Banga et al. ............... | 709/217 |
| 6,308,222 B1 | * | 10/2001 | Krueger et al. ............. | 709/247 |

FOREIGN PATENT DOCUMENTS

| | | |
|---|---|---|
| JP | 2-158862 | 6/1990 |
| JP | 5-324651 | 12/1993 |

OTHER PUBLICATIONS

Article—"Multi–Objective Proxy Server DeleGate Function Details"; Interface, CQ Publishing Co., Inc., vol. 21, No. 9; pp. 130–146; Sep. 1995.

Article—vol. 14, No. 1, pp. 55–63—Jan. 1997 "Basic Technology and Application of Internet Firewalls Structure of DeleGate, Iwanami Shoten, Computer Software" (Japan Society for Software Science and Technology).

\* cited by examiner

*Primary Examiner*—Cesar B Paula
(74) *Attorney, Agent, or Firm*—Foley & Lardner LLP

(57) ABSTRACT

A document processing apparatus implemented in a client/server system to add and modify a document conversion function without modification for either client or server. The apparatus comprises a client requesting acquisition or storage of a document, a server performing management such as transfer and storage of the document, a network connecting the client and the server, and a proxy server existing on the network and relaying interaction between the client and the server. The proxy server has a document data conversion section for performing conversion of the document based on the structure of document.

23 Claims, 4 Drawing Sheets

Figure 3

DOCUMENT F

OVERVIEW:
SOFTWARE PROVIDING INFORMATION SERVICES FOR A PORTABLE INTERNET MOBILE TERMINAL

PURPOSE:
- REDUCTION OF AMOUNT OF DATA TO BE TRANSFERRED IN COMMUNICATION ENVIRONMENT WITH LOW BIT RATE
- GENERATION OF HTML CONTENT DATA ACCOMMODATING A DISPLAY AREA OF THE TERMINAL

BASIC FUNCTIONS:
- CREATION OF TABLE OF CONTENTS OF A HTML DOCUMENT, DIVISION OF THE DOCUMENT
  ENUMERATION OF TOPICS CONTAINED IN THE HTML DOCUMENT
- CONVERSION OF MEDIUM
  CONTRACTION AND SUBTRACTION OF COLORS OF IMAGE DATA, CONVERSION OF JPEG AND XBM IMAGE DATA INTO GIF
  . . . . .

TABLE OF CONTENTS F'

1. OVERVIEW
   1. PURPOSE
   2. BASIC FUNCTIONS
      1. CREATION OF TABLE OF CONTENTS AND DIVISION OF A DOCUMENT
      2. SYSTEM CONFIGURATION
   4. ADVANTAGES
2. DEMONSTRATION ENVIRONMENT
3. FUTURE PLAN

DOCUMENT PIECES F_i

ADVANTAGES:
- SHORTENING OF STANDBY TIME DUE TO REDUCTION OF AMOUNT OF DATA TO BE TRANSFERRED
- IT IS POSSIBLE TO EASILY UNDERSTAND OVERVIEW OF A DOCUMENT WITH LARGE SIZE ON A SMALL SCREEN AS A TABLE OF CONTENTS
- ONLY NECESSARY INFORMATION CAN BE LOADED THROUGH DIVISION OF DOCUMENT
- IMAGE DATA SUITABLE FOR A TERMINAL CAN BE DISPLAYED THROUGH MEDIUM CONVERSION

DOCUMENT CONVERSION USING AN INTERMEDIATE COMPUTER WHICH RETRIEVES AND STORES POSITION INFORMATION ON DOCUMENT DATA

BACKGROUND OF THE INVENTION

1. Field of the Invention

The present invention relates to a document conversion system for a document processing apparatus implemented in a client/server system, which converts and transfers a document between a client and a server.

2. Description of the Related Art

In a document processing apparatus implemented in a client/server system, there may be a case where the client wants the server to transfer the table of contents of a document for confirmation of its content before requesting the server to transfer the entire document, and then requests the server to transfer necessary portions of the document based on its table of contents, or where, when the client modifies portions of a document, it wants to transfer only the modified portions instead of the entire document to update the document in the server.

In such a case, the conventional document processing apparatus obtains a document structure in the client or server by analyzing morphological features of the document or utilizing control character strings in the document, constructs the table of contents based on it, and divides the document into minimum units corresponding to each item or document piece.

For example, Japanese Patent Application Laid-Open No. 2-158862 describes an example of such prior art. In the technology, a document edit section connects to an input section, an output section, a document structure analyzer section, and a storage section, and a document management section is provided between the document edit section and the storage section. Here, the document management section consists of a version management section and a document composition section, while the storage section is further divided into, for one document, a storage section for version information file, a storage section for document composition file, and a storage section for a plurality of document files. A document created in the document edit section is analyzed for its morphological features in the document structure analyzer section, thereby a document structure is extracted. The document edit section generates a table of contents from the document structure. The document management section divides the documents into document pieces each of which is a minimum unit corresponding to each item of the table of contents, and stores the document composition in the document composition file storage section, and each document piece in the document file storage section.

However, in this conventional arrangement, since the analyzer section for document structure is incorporated in the server or client, or in both constituting the document processing apparatus, if it is intended to newly add a document structure analysis function and a document conversion function to the document processing apparatus, or if it is intended to modify an existing document structure analysis function and an existing document conversion function, there arises a problem that modification is required for all clients or servers, or both.

In addition, since document data may have a special format for document structure analysis and document conversion, if it is intended for a document structure analysis function and a document conversion function to be newly added, or if it is intended to modify an existing document structure analysis function and an existing document conversion function, it may require not only modification of functions in the document processing apparatus, but also modification of document data. Consequently, if document processing is performed while using another document processing apparatus, there arises a problem that document data is required to be maintained for a document in a plurality of formats corresponding to the respective document processing apparatus, and integrity is required to be maintained between the document data in such plurality of formats.

SUMMARY OF THE INVENTION

An object of the present invention is to provide a system and method for document conversion, and a recording medium recorded with a document conversion program that enables such document processing apparatus implemented in a client/server system to add a document structure analysis function and a document conversion function, and to modify the document structure analysis function and the document conversion function without modification for either client or server.

Another object of the present invention is to provide a system and method for document conversion, and a recording medium recorded with a document conversion program that eliminates need of management of document data in a plurality of formats for one document for the document structure analysis and document conversion functions, thereby simplifying the configuration of system and improving serviceability and reuse of resources.

A first document conversion system according to the present invention is a document conversion system connecting a first computer having document data and a second computer using the document data through a network, the system comprising a repeater computer, wherein the repeater computer sends a request for transferring the document data to the first computer when the request for transferring a document structure data for the document data is received from the second computer, and generates the document structure data from the document data and sends it to the second computer when the document data is received from the first computer.

A second document conversion system according to the present invention is the first document conversion system, wherein the repeater computer comprises a document data conversion section, the document data conversion section retrieving and storing a request for conversion from the document data to the document structure data from the transfer request for document structure data received from the second computer, and then converting the document data received from the first computer into the document structure data received from the first computer based on the conversion request.

A third document conversion system according to the present invention is a document conversion system connecting a first computer having document data and a second computer using the document data through a network, the system comprising a repeater computer, wherein the repeater computer sends a request for transferring the document data to the first computer when a request for transferring partial document data contained in the document data is received from the second computer, and extracts the partial document data from the document data and sends it to the second computer when the document data is received from the first computer.

A fourth document conversion system according to the present invention is the third document conversion system, wherein the repeater computer comprises a document data conversion section, the document data conversion section retrieving and storing position information on the partial document data in the document data from the transfer request for partial document data received from the second computer, and then extracting the partial document data at a position corresponding to the position information in the document data received from the first computer.

A fifth document conversion system according to the present invention is a document conversion system connecting a first computer having document data and a second computer using the document data through a network, the system comprising a repeater computer, wherein, when the repeater computer receives update data for updating the document data from the second computer, it sends a request for transferring the document data to the first computer, and, when it receives the document data from the first computer, updates the document data with the update data, and then sends it to the first computer.

A sixth document conversion system according to the present invention is the fifth document conversion system, wherein the repeater computer comprises a document data conversion section, the document data conversion section retrieving and storing position information in the document data indicating a position to be updated according to the update data from the transfer request for update data received from the second computer, and then updating the position corresponding to the position information in the document data received from the first computer with the update data.

A seventh document conversion system according to the present invention is the second, fourth or sixth document conversion system, wherein the repeater computer comprises a document data storage section for storing either one or both of a duplicate of the document data that the first computer has or document data after processing for the document data.

An eighth document conversion system according to the present invention is the second, fourth or sixth document conversion system, wherein the repeater computer comprises a processing request storage section for storing a processing request from the second computer for the document data.

A first document conversion method according to the present invention is a document conversion method for a repeater computer, the repeater computer being connected to a first computer having document data and a second computer using the document data through a network, and relaying transfer of document data between the first and second computers, the method comprising a first step for receiving a request for transferring document structure data for the document data from the second computer, a second step for sending the transfer request for the document data to the first computer when the transfer request is received in the first step, a third step for receiving the document data from the first computer, and a fourth step for generating the document structure data from the document data and sending it to the second computer when the document data is received in the third step.

A second document conversion method according to the present invention is the first document conversion method further comprising a step for retrieving and storing a request for conversion from the document data to the document structure data from the transfer request for document structure data received from the second computer, and a step for converting the document data received from the first computer into the document structure data received from the first computer based on the conversion request.

A third document conversion method according to the present invention is a document conversion method for a repeater computer, the repeater computer being connected to a first computer having document data and a second computer using the document data through a network, and relaying transfer of document data between the first and second computers, the method comprising a first step for receiving a request for transferring partial document data contained in the document data from the second computer, a second step for sending the transfer request for the document data to the first computer when the transfer request is received in the first step, a third step for receiving the document data from the first computer, and a fourth step for extracting the partial document data from the document data and sending it to the second computer when the document data is received in the third step.

A fourth document conversion method according to the present invention is the third document conversion method further comprising a step for retrieving and storing position information on the partial document data in the document data from the transfer request for partial document data received from the second computer, and a step for extracting the partial document data at a position corresponding to the position information in the document data received from the first computer.

A fifth document conversion method according to the present invention is a document conversion system for a repeater computer, the repeater computer being connected to a first computer having document data and a second computer using the document data through a network, and relaying transfer of document data between the first and second computers, the method comprising a first step for receiving update data for updating the document data from the second computer, a second step for sending the transfer request for the document data to the first computer when the update data is received in the first step, a third step for receiving the document data from the first computer, and a fourth step for updating the document data with the update data and sending it to the first computer when the document data is received in the third step.

A sixth document conversion method according to the present invention is the fifth document conversion method further comprising a step for retrieving and storing position information in the document data indicating a position to be updated according to the update data from the transfer request for update data received from the second computer, and a step for updating the position corresponding to the position information in the document data received from the first computer with the update data.

A seventh document conversion method according to the present invention is the second, fourth or sixth document conversion method further comprising a step for storing either one or both of a duplicate of the document data that the first computer has or document data after processing for the document data.

An eighth document conversion method according to the present invention is the second, fourth or sixth document conversion method further comprising a step for storing a processing request from the second computer for the document data.

A first recording medium according to the present invention is a recording medium recording a program, the program causing a repeater computer, the repeater computer being connected to a first computer having document data and a second computer using the document data through a network, and relaying transfer of document data between the first and second computers, to execute first processing for receiving a request for transferring a document structure data for the document data from the second computer, second processing for sending the transfer request for the document data to the first computer when the transfer request is received in the first processing, third processing for receiving the document data from the first computer, and fourth processing for generating the document structure data from the document data and sending it to the second computer when the document data is received in the third processing.

A second recording medium according to the present invention is the first recording medium, wherein the program further causes it to execute processing for retrieving and storing a request for conversion from the document data to the document structure data from the transfer request for document structure data received from the second computer, and processing for converting the document data received from the first computer into the document structure data based on the conversion request.

A third recording medium according to the present invention is a recording medium recording a program, the program causing a repeater computer, the repeater computer being connected to a first computer having document data and a second computer using the document data through a network, and relaying transfer of document data between the first and second computers, to execute first processing for receiving a request for transferring partial document data contained in the document data from the second computer, second processing for sending the transfer request for the document data to the first computer when the transfer request is received in the first processing, third processing for receiving the document data from the first computer, and forth processing for extracting the partial document data from the document data and sending it to the second computer when the document data is received in the third processing.

A fourth recording medium according to the present invention is the second recording medium, wherein the program further causes it to execute processing for retrieving and storing position information on the partial document data in the document data from the transfer request for partial document data received from the second computer, and processing for extracting the partial document data at a position corresponding to the position information in the document data received from the first computer.

A fifth recording medium according to the present invention is a recording medium recording a program, the program causing a repeater computer, the repeater computer being connected to a first computer having document data and a second computer using the document data through a network, and relaying transfer of document data between the first and second computers, to execute first processing for receiving update data for updating the document data from the second computer, second processing for sending the transfer request for the document data to the first computer when the update data is received in the first processing, third processing for receiving the document data from the first computer, and fourth processing for updating the document data with the update data and sending it to the first computer when the document data is received in the third processing.

A sixth recording medium according to the present invention is the fifth recording medium, wherein the program further causes it to execute processing for retrieving and storing position information in the document data indicating a position to be updated according to the update data from the transfer request for update data received from the second computer, and processing for updating the position corresponding to the position information in the document data received from the first computer with the update data.

A seventh recording medium according to the present invention is the second, fourth or sixth recording medium, wherein the program further causes it to execute processing for storing either one or both of a duplicate of the document data that the first computer has or document data after processing for the document data.

An eighth recording medium according to the present invention is the second, fourth or sixth recording medium, wherein the program further causes it to execute processing for storing a processing request from the second computer for the document data.

BRIEF DESCRIPTION OF THE DRAWINGS

The above-mentioned objects and advantages of the invention will become more apparent from the following detailed description when read in conjunction with the accompanying drawings, with like reference numerals indicating corresponding parts throughout, and wherein:

FIG. 3 is a conceptual diagram showing an example of representation of a document according to the present invention.

DETAILED DESCRIPTION OF THE PREFERRED EMBODIMENTS

Embodiments of the present invention will be explained in detail with reference to the drawings.

Figure 1:
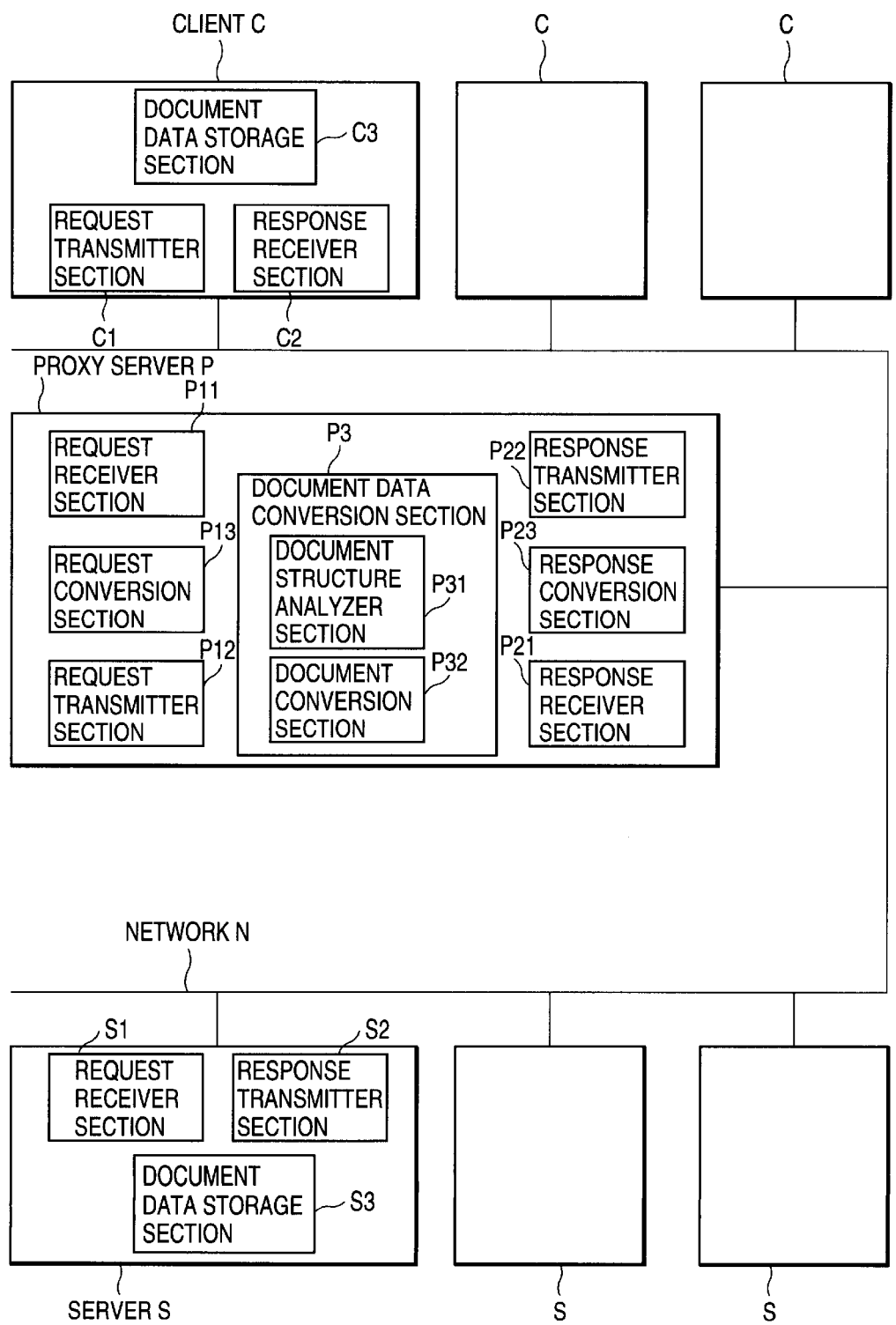
FIG. 1 is a block diagram showing the arrangement of a first embodiment of the present invention.

FIG. 1 is a block diagram showing a first embodiment of the present invention.

Referring to FIG. 1, the first embodiment of the document conversion system according to the present invention comprises one or more clients C for requesting a server to acquire and store a document, one or more servers S for acquiring and storing the document in response to the request from the client C, a network N for connecting the clients C and the servers S, and a proxy server P existing on the network N and for relaying interaction between the client C and the server S.

In the client C, a request transmitter section C1 and a response receiver section C2 are interfaced with the network N. The request transmitter section C1 transmits a request to the server S, and the response receiver section C2 receives a response from the server S. A document data storage section C3 stores and manages the document.

On the other hand, in the server S, a request receiver section S1 and a response transmitter section S2 are interfaced with the network N. The request receiver sections S1 receives a request from the client C. The response transmitter section S2 transmits to the client C a response corresponding to a request from the client C. A document data storage section S3 stores and manages the document.

Moreover, the proxy server P, which interfaces with the network N and relays information between the client C and the server S through the network N, has a request receiver section P11, a request transmitter section P12, a response receiver section P21, and a response transmitter section P22. The request receiver section P11 receives a request from the client C which is to be sent to the server 5, on behalf of the server S. The request transmitter section P12 transmits a request received by the request receiver section P11 to the server S, on behalf of the client C. The response receiver section P21 receives a response transmitted from the server S to the client C, on behalf of the client C. The response transmitter section P22 transmits a response received by the response receiver section P21 and sent to the client C, on behalf of the server S. In addition, in the proxy server P, a request conversion section P13 converts a request sent by the client C to the server S. A response conversion section P23 converts a response received from the server S. A document conversion section P3 converts a document from a server S and sent to the client C, or from the client C and sent to the server S. The document data conversion section P3 includes a document structure analyzer section P31 for analyzing the structure of a document, and a document conversion section P32 for converting a document based on the analyzed document structure.

Figure 2:
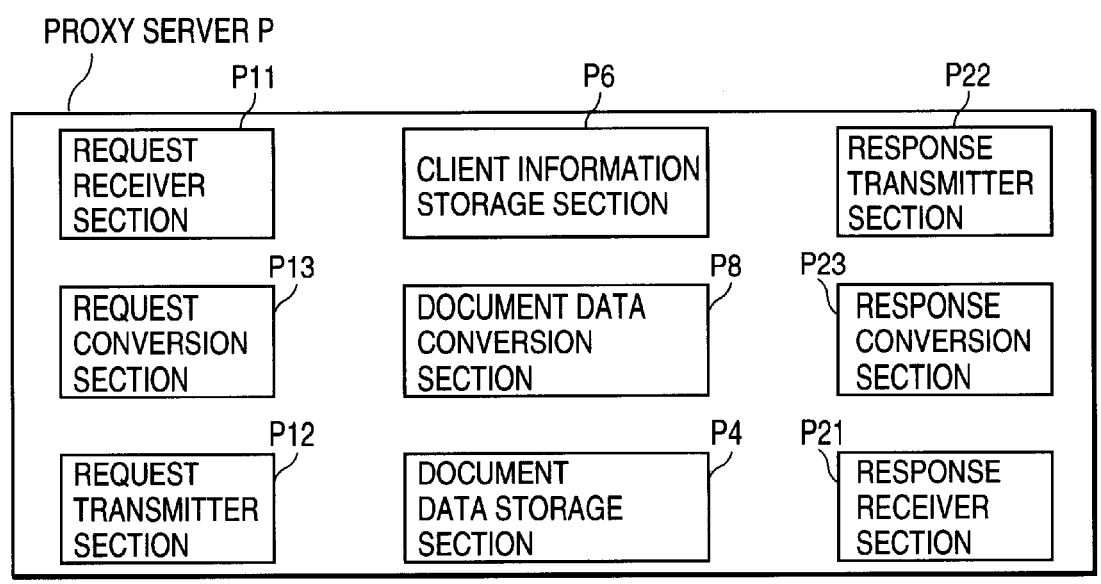
FIG. 2 is a block diagram showing another arrangement of a proxy server in the first embodiment of the present invention.

In addition, the proxy server P may have an arrangement as shown in FIG. 2.

Referring to FIG. 2, the proxy server P has a document data storage section P4 for storing document data, and a client information storage section P6 for storing information on the client C, in addition to the basic arrangement shown in FIG. 1.

FIG. 3 is a conceptual diagram showing an example of representation of document data. In FIG. 3, F denotes a document, F' denotes a table of contents of the document F, and F_i denotes a document piece aggregation of the document F.

Now, operation of the first embodiment of the present invention will be described with reference to FIGS. 1–3.

First, description is given by exemplifying a case where a request from the client C to the server S is to acquire a table of contents.

When the client C wishes to acquire a table of contents F' of a document F on the server S, it transmits, through the network, a request for acquiring the table of contents F' of the document F on the server S from the request transmitter section C1 of the client C to the proxy server P on the network N. The request contains a request for processing for generation of the table of contents F' to be performed by the document conversion section P23 of the proxy server P on the document F acquired from the server S together with the request to the server S for acquiring the document F.

The proxy server P divides, in the request conversion section P13, the request received by the request receiver section P11 into a request to be transmitted to the server S for acquiring the document F, and a request for conversion processing of the document including the request for generating the table of contents. Then, it transmits the request to the server S from the request transmitter section P12 through the network N, and provides the document conversion processing request to the document data conversion section P3.

The server S retrieves a corresponding document F from the document data storage section S3 based on the request received in the request receiver section S1, and transmits it to the proxy server P from the response transmitter section S2 through the network N.

The proxy server P receives the response from the server S at the response receiver section P21, and provides it to the response conversion section P23. The response conversion section P23 retrieves the document data F from the response, and provides it to the document data conversion section P3. The document data conversion section P3 analyzes the structure of the document F in the document structure analyzer section P31, performs document conversion in the document conversion section P32 based on the document conversion processing request acquired from the request conversion section P13 to generate the table of contents F', and transmits it from the response transmitter section P22 to the client C through the network N. Here, the method, for example, described in the above-mentioned Japanese Patent Application Laid-Open No. 2-158862 is used in converting the document F into the table of contents F'.

Now, description is given by exemplifying a case where a request from the client C to the server S is to acquire document pieces F_i.

For the client C to acquire document pieces F_i of a document F on the server S, the client transmits, through the network, a request for acquiring the document pieces F_i of the document F from the request transmitter section C1 to the proxy server P on the network N. The request contains a request on document piece creation processing on the document F acquired from the server S to be performed by the document conversion section P32 of the proxy server P together with the request for acquiring the document F on the server S, and, particularly, an identifier indicating where the document pieces reside in the document.

The proxy server P divides, in the request conversion section P13, the request received at the request receiver section P11 into a request for acquiring the document F to be transmitted to the server S, and a document conversion processing request containing a document piece creation request that, in turn, contains an identifier indicating the positions of document pieces in the document. Then, it transmits the request for the server S from the request transmitter section P12 to the server S through the network N, and provides the document conversion request to the document data conversion section P3.

The server S retrieves an appropriate document F from the document data storage section S3 based on the request received at the request receiver section S1, and transmits it from the response transmitter section S2 to the proxy server P through the network N.

The proxy server P receives a response from the server S at the response receiver section P21, and provides it to the response conversion section P23. The response conversion section P23 retrieves document data F from the response, and provides it to the document data conversion section P3. The document data conversion section P3 analyzes the structure of document F in the document structure analyzer section P31, performs document conversion in the document conversion section P32 based on the document conversion processing request obtained from the request conversion section P13 to create the document pieces F_i, and transmits them from the response transmitter section P22 to the client C through the network N.

Now, description is given by exemplifying a case where a request from the client C to the server S is to store the document pieces F_i.

For the client C to store the document pieces F_i of the document F on the server S, the client C transmits, through the network N, a request for storing the document pieces F_i of the document F on the sever S from its request transmitter section C1 to the proxy server P on the network N. The request contains a request on document piece storage processing on the document F on the server S to be performed by the document conversion section P32 of the proxy server P together with the request for storing the document F for the server S, and, particularly, an identifier indicating where the document pieces F_i reside in the document F.

The proxy server P divides, in the request conversion section P13, the request received at the request receiver section P11 into a request for storing the document F to be sent to the server S, and a document conversion processing request including a document piece storage request containing the identifier indicating where the document pieces F_i reside in the document F, and the document pieces F_i. It provides the document conversion processing request to the document data conversion section P3, creates a request for acquiring the document F, and transmits it from the request transmitter section P12 to the server S through the network N.

The server S retrieves an appropriate document F from the document data storage section S3 based on the request received at the request receiver section S1, and transmits it to the proxy server P from the response transmitter section S2 through the network N.

The proxy server P provides the response from the server S received at the response receiver section P21 to the response conversion section P23. The response conversion section P23 retrieves the document data F from the response, and provides it to the document data conversion section P3. The document data conversion section P3 analyzes the structure of the document F at the document structure analyzer section P31, performs document conversion at the document conversion section P32 based on the document conversion processing request acquired from the request conversion section P13, and updates the document F by replacing the portions in the document F corresponding to the document pieces F_i with the document pieces F_i updated at the client C. The request conversion section P13 generates a request for storing the document F updated in the document data conversion section P3, and transmits the request from the request transmitter section P12 to the server S through the network N.

The server S stores an appropriate document F in the document data storage section S3 based on the request received at the request receiver section S1.

Figure 4:
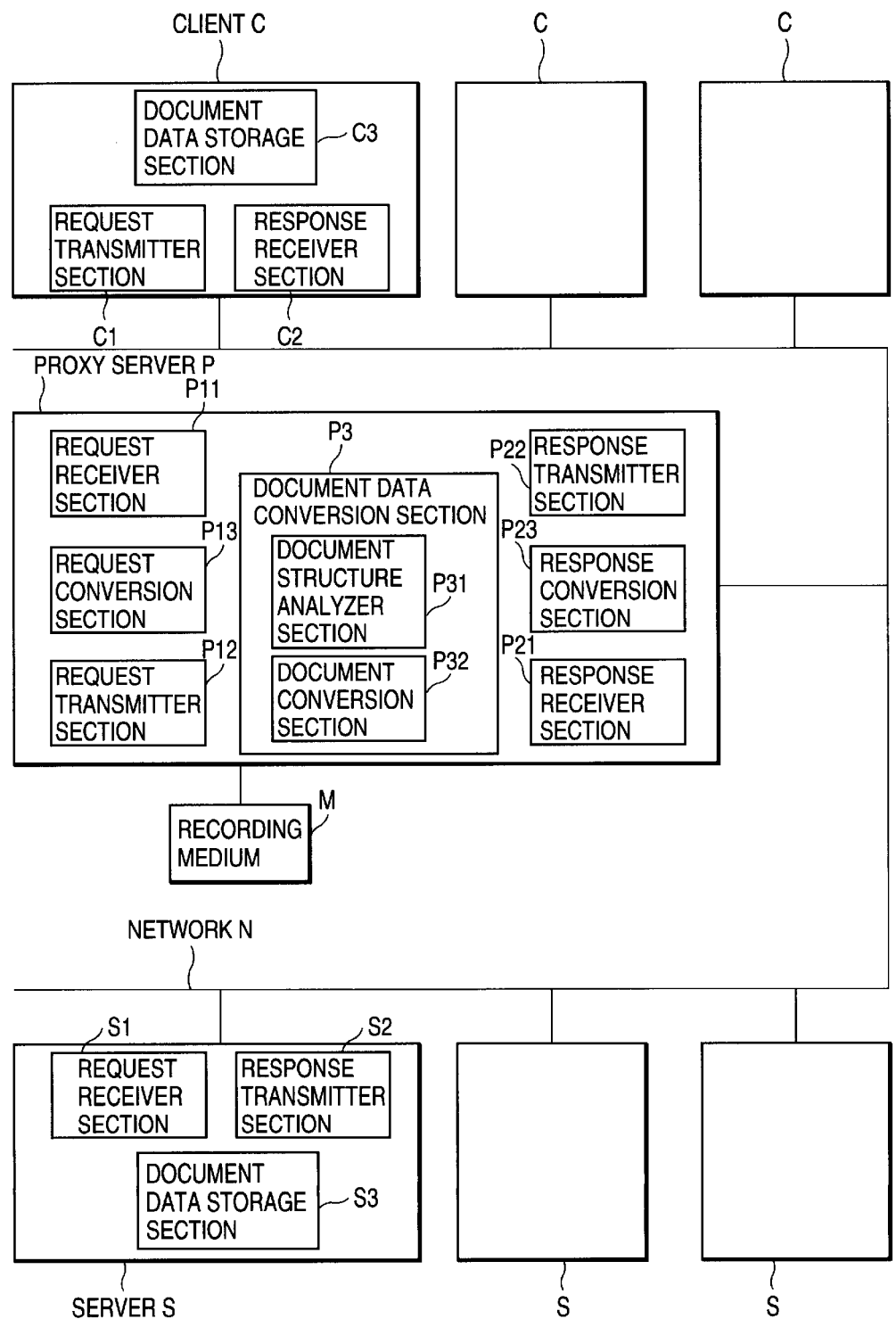
FIG. 4 is a block diagram showing the arrangement of a second embodiment of the present invention.

Further referring to FIG. 4, a second embodiment of the present invention comprises a storing (or recording) medium M having a document conversion program stored therein. The storing medium M may be a magnetic disk, a semiconductor memory, or other storing or recording medium.

The document conversion program is read from the storing medium M, and controls the operation of a proxy server P'. The proxy server P' performs processing similar to that performed by the proxy server P of the first embodiment under the control of the document conversion program.

In the first and second embodiments, the document conversion performed by the document conversion section P32 of the document data conversion section P3 is assumed to comprise a function for generating a table of contents F' which is prepared by extracting topics as headings from a document F, a function for generating document pieces F_i from the document F and an identifier indicating where the document pieces F_i reside in the document, and a function for generating a document in which the document pieces F_i in the document F are replaced with document pieces F_i updated by the client C from the document F, the document pieces F_i updated by the client C and the identifier indicating where the document pieces F_i reside in the document. The present invention is not limited to such functions. Examples of document obtained by analyzing document structure of a document include an outline prepared by extracting headings and several top characters of each paragraph, and document pieces corresponding to each item of the outline, in addition to the table of contents F' prepared by extracting topics as headings from the document F. In addition, the document pieces F_i may not necessarily correspond to a table of contents or items of an outline, but may be any portions specified by the user such as m-th portion of the document F when it is divided into n pieces.

In addition, in the first and second embodiments, the document conversion performed by the document conversion section P32 of the document data conversion section P3 broadly includes conversion on all elements constituting a document including contraction or subtraction of colors of a figure, and may not depend on the result of the document structure analyzer section P31.

Furthermore, in the first and second embodiments, although the proxy server P requests document data from the server S as needed, this process may be omitted by, as shown in FIG. 2, storing duplicate of parts or all of document data on the server S in the document data storage section P4 on the proxy server P. Moreover, it may be possible to omit processing in the document data conversion section P3 on the same previous processing for the same document by storing results of conversion on a document in the document data conversion section P4. Furthermore, document data of the server S may be stored in the storing medium M of the second embodiment as a cache-like arrangement, where the most recent or most likely to be accessed document data are stored in the storing medium M.

Furthermore, it may be arranged for the client information storage section P6 on the proxy server P to be capable of registering and modifying information on a document conversion processing request from the client C, and thus it would be possible to provide conversion processing customized for each client.

Furthermore, if user authentication can be provided, it is possible to customize conversion processing for each user by holding a document conversion processing request for each user.

According to the embodiments of the present invention, there is provided an advantage that, if the existing client/server type document processing apparatus is added with document processing based on a document structure analysis function on the proxy server relaying interaction between the client and the server, such document processing can be easily added or modified, and management of document file formats is made unnecessary for the document structure analysis function and the document conversion.

In addition, the document structure analysis function provides an advantage that supports the user to understand the structure of document, and can reduce amount of data to be acquired and time for it by acquiring only necessary portions based on the document structure.

The present invention enables a document processing apparatus implemented in a client/server system to add functions for analyzing the structure of a document and for converting a document, and to modify a document conversion function without any modification for either the client or the server.

In addition, the present invention makes it unnecessary to manage document data in a plurality of formats for the same document for the document structure analysis function and the document conversion function, whereby the system is simplified for its arrangement to improve serviceability and reutilization of resources.

While embodiments have been described herein, modification of the described embodiments may become apparent to those of ordinary skill in the art, following the teachings of the invention, without departing from the scope of the invention as set forth in the appended claims. For example, the invention may be utilized with a plurality of proxy servers, but in that case, the proxy servers have to synchronize with each other to ensure proper data updating and conversion (i.e., for a single document being modified by a plurality of users, to be stored in a single server).

What is claimed is:

1. A document conversion system connecting a first computer having document data and a second computer using said document data through a network, said system comprising:

a repeater computer, wherein said repeater computer sends to said first computer a request for transferring said document data when a request for transferring partial document data contained in said document data is received from said second computer, wherein said request for transferring said document data is created and output by said repeater computer based solely on information provided in said request for transferring said partial document data, and wherein said repeater computer extracts said partial document data from said document data and sends said partial document data to said second computer when said document data is received from said first computer, wherein said partial document data, as extracted by said repeater computer, is processed by an application program running on said second computer, without any modification of said partial document data;

wherein said repeater computer comprises a document data conversion section, wherein said document data conversion section retrieves and stores position information on said partial document data in said document data from said transfer request for partial document data received from said second computer, and wherein said document data conversion section extracts said partial document data at a position corresponding to said position information said document data received from said first computer.

2. The document conversion system as set forth in claim 1, wherein said repeater computer comprises a document data storage section for storing either one or both of a duplicate of said document data that said first computer has or document data after said repeater computer has processed said document data.

3. The document conversion system as set forth in claim 1, further comprising a storing medium configured to store a document conversion program, said document conversion program providing control of said repeater computer.

4. The document conversion system as set forth in claim 1, wherein said repeater computer comprises a processing request storage section for storing a processing request from said second computer for said document data.

5. The document conversion system as set forth in claim 3, wherein said storing medium also stores at least a portion of said document data when said document data is received from said first computer as a result of said first computer responding to said request for transferring said document data output by said repeater computer, to thereby lessen a number of accesses to said first computer by said repeater computer, and wherein said storing medium stores said portion of said document data even after said partial document data has been output by said repeater computer to said second computer.

6. A document conversion system connecting a first computer having document data and a second computer using said document data through a network, the system comprising:

a repeater computer, wherein said repeater computer sends a request to said first computer for transferring said document data when update data for updating said document data is received by said repeater computer as sent directly to said repeater computer from said second computer in an update request that does not pass through said first computer, wherein said request for transferring said document data is created and output by said repeater computer based on information provided in said update request, and wherein said repeater computer updates said document data with said update data and then sends said updated document data to said first computer when said document data is received from said first computer;

wherein said repeater computer comprises a document data conversion section, wherein said document data conversion section retrieves and stores position information in said document data indicating a position to be updated according to said update data from said transfer request for update data received from said second computer, and wherein said document data conversion section updates the position corresponding to said position information in said document data received from said first computer with the update data.

7. The document conversion system as set forth in claim 6, wherein said repeater computer comprises a document data storage section for storing either one or both of a duplicate of said document data that said first computer has or document data after said repeater computer has processed said document data.

8. The document conversion system as set forth in claim 6, wherein said repeater computer comprises a processing request storage section for storing a processing request from said second computer for said document data.

9. A document conversion method for a repeater computer, said repeater computer being connected to a first computer having document data and a second computer using said document data through a network, and relaying transfer of document data between said first and second computers, said method comprising:

a first step for receiving, by said repeater computer, a request for transferring partial document data contained in said document data, the request for transferring said partial document data being created and output by said second computer;

a second step for sending, by said repeater computer, said transfer request for said document data to said first computer when said transfer request is received by said repeater computer in said first step;

a third step for receiving, by said repeater computer, said document data output by said first computer; and a fourth step for extracting, by said repeater computer, said partial document data from said document data based solely on the request for transferring said document structure data, and for sending said partial document data to said second computer when said document data is received by said repeater computer in said third step, wherein said partial document data, as extracted by said repeater computer, is processed by an application program running on said second computer, without any modification of said partial document data;

a fifth step for retrieving and storing, by said repeater computer, position information on said partial document data in said document data from said transfer request for partial document data, received from said second computer; and a sixth step for extracting, by said repeater computer, said partial document data at a position corresponding to said position information in said document data received by said repeater computer as output from said first computer.

10. The document conversion method as set forth in claim 9, further comprising a step for storing, by said repeater computer, either one or both of a duplicate of said document data that said first computer has or document data after said repeater computer has processed said document data.

11. The document conversion method as set forth in claim 9, further comprising a step for storing, by said repeater computer, a processing request from said second computer for said document data.

12. A document conversion method for a repeater computer, said repeater computer being connected to a first computer having document data and a second computer using said document data through a network, and relaying transfer of document data between said first and second computers, said method comprising:

a first step for receiving, by said repeater computer, update data for updating said document data, the update data being included in an update request output by said second computer and which is sent directly to said repeater computer from said second computer;

a second step for sending, by said repeater computer, a transfer request for said document data to said first computer when said update data is received by said repeater computer in said first step;

a third step for receiving, by said repeater computer, said document data output by said first computer; and a fourth step for updating, by said repeater computer, said document data with said update data, and for sending said updated document data to said first computer when said document data is received by said repeater computer in said third step;

a fifth step for retrieving and storing, by said repeater computer, position information in said document data indicating a position to be updated according to said update data from said transfer request for update data received from said second computer; and a sixth step for updating, by said repeater computer using said update data, said position corresponding to said position information in said document data received by said repeater computer as output from said first computer.

13. The document conversion method as set forth in claim 12, further comprising a step for storing, by said repeater computer, either one or both of a duplicate of said document data that said first computer has or document data after said repeater computer has processed said document data.

14. The document conversion method as set forth in claim 12, further comprising a step for storing, by said repeater computer, a processing request from said second computer for said document data.

15. A recording medium recording a program, said program causing a repeater computer, said repeater computer being connected to a first computer having document data and a second computer using said document data through a network, and relaying transfer of document data between said first and second computers, to execute the following steps:

a first processing for receiving, by said repeater computer, a request for transferring partial document data contained in said document data, the request for transferring said partial document data being created and output by said second computer;

a second processing for sending, by said repeater computer, said transfer request for said document data to said first computer when said transfer request is received by said repeater computer in said first processing;

a third processing for receiving, by said repeater computer, said document data output by said first computer; and a fourth processing for extracting, by said repeater computer, said partial document data from said document data based solely on the request for transferring said document structure data, and for sending said partial document data to said second computer when said document data is received by said repeater computer in said third processing, wherein said partial document data, as extracted by said repeater computer, is processed by an application program running on said second computer, without any modification of said partial document data;

a fifth processing for retrieving and storing position information on said partial document data in said document data from said transfer request for partial document data received from said second computer; and a sixth processing for extracting said partial document data at a position corresponding to said position information in said document data received by said repeater computer as output from said first computer.

16. The recording medium as set forth in claim 15, wherein said program further causes said repeater computer to execute processing for storing a processing request output from said second computer for said document data.

17. The recording medium as set forth in claim 15, wherein said program further causes said repeater computer to execute a processing for storing either one or both of a duplicate of said document data that said first computer has or document data after said repeater computer has processed said document data.

18. A recording medium recording a program, said program comprising a repeater computer, said repeater computer being connected to a first computer having document data and a second computer using said document data through a network, and relaying transfer of document data between said first and second computers, to execute the following steps:

a first processing for receiving, by said repeater computer, update data for updating said document data, the update data included in an update request output by said second computer and which is sent directly to said repeater computer from said second computer;

a second processing for sending, by said repeater computer, a transfer request for said document data to said first computer when said update data is received by said repeater computer in said first processing;

a third processing for receiving, by said repeater computer, said document data output by said first computer;

and a fourth processing for updating, by said repeater computer, said document data with said update data, and for sending said updated document data to said first computer when said document data is received by said repeater computer in said third processing;

a fifth processing for retrieving and storing position information in said document data indicating a position to be updated according to said update data from said transfer request for update data received by said repeater computer as output by said second computer; and a sixth processing for updating, with said update data, said position corresponding to said position information in said document data received by said repeater computer as output by said first computer.

19. The recording medium as set forth in claim 18, wherein said program further causes said repeater computer to execute a processing for storing either one or both of a duplicate of said document data that said first computer has or document data after said repeater computer has processed said document data.

20. The recording medium as set forth in claim 18, wherein said program further causes said repeater computer to execute processing for storing a processing request output from said second computer for said document data.

21. The recording medium as set forth in claim 18, wherein said program further causes said repeater computer to execute processing for storing a processing request output from said second computer for said document data.

22. The document conversion system as set forth in claim 6, said repeater computer updates said document data based solely on said update data as provided by said second computer and does not perform any other updating of said document data.

23. The document conversion system as set forth in claim 6, wherein all document data that is sent between said first computer and said second computer must pass through said repeater computer.

* * * * *